United States Patent [19]

Van Duser

[11] Patent Number: 4,949,930
[45] Date of Patent: Aug. 21, 1990

[54] FLOATING KNEE PIVOT SUSPENSION

[75] Inventor: Harold J. Van Duser, Reedsburg, Wis.

[73] Assignee: Seats, Inc., Reedsburg, Wis.

[21] Appl. No.: 348,163

[22] Filed: May 1, 1989

Related U.S. Application Data

[60] Continuation of Ser. No. 245,659, Sep. 16, 1988, abandoned, which is a division of Ser. No. 67,102, Jun. 26, 1987, Pat. No. 4,828,216.

[51] Int. Cl.⁵ ............................................. F16M 13/00
[52] U.S. Cl. ..................................................... 248/421
[58] Field of Search ............... 248/593, 638, 157, 560, 248/562, 564, 580, 584, 585, 586, 587, 591, 592, 595, 596, 597, 598, 421, 281.1

[56] References Cited

U.S. PATENT DOCUMENTS

| | | | |
|---|---|---|---|
| 2,620,855 | 12/1952 | Stone | 248/493 |
| 2,652,880 | 9/1953 | Gundersen | 248/587 |
| 2,840,140 | 6/1958 | Harrington . | |
| 2,894,562 | 7/1959 | Peller | 248/421 |
| 3,285,562 | 11/1966 | Langer | 248/562 |
| 3,319,920 | 5/1967 | Freedman | 248/585 |
| 3,519,241 | 7/1940 | Tschursch | 248/564 |
| 3,711,149 | 1/1973 | Carter . | |
| 3,761,045 | 9/1973 | Sturhan . | |
| 3,788,697 | 1/1974 | Barton et al. . | |
| 3,879,007 | 4/1975 | Barton . | |
| 3,913,975 | 10/1975 | Carter . | |
| 3,951,373 | 4/1976 | Swenson | 248/585 |
| 3,986,748 | 10/1976 | Magnuson . | |
| 3,999,800 | 12/1976 | Penzotti . | |
| 4,153,295 | 5/1979 | Boulanger et al. . | |
| 4,181,355 | 1/1980 | Grass et al. . | |
| 4,351,556 | 9/1982 | Worringer . | |
| 4,494,794 | 1/1985 | Barley . | |
| 4,505,513 | 3/1985 | Barley . | |
| 4,678,155 | 7/1987 | Carter | 248/564 |
| 4,702,454 | 10/1987 | Izumida | 248/585 |

FOREIGN PATENT DOCUMENTS

| | | | |
|---|---|---|---|
| 1070045 | 11/1959 | Fed. Rep. of Germany | 248/564 |
| 1808330 | 5/1970 | Fed. Rep. of Germany | 248/562 |
| 2843223 | 4/1980 | Fed. Rep. of Germany . | |
| 3535649 | 4/1987 | Fed. Rep. of Germany | 248/560 |
| 355703 | 8/1961 | Switzerland | 248/564 |
| 422646 | 9/1974 | U.S.S.R. | 248/584 |
| 533508 | 11/1976 | U.S.S.R. | 248/564 |
| 658064 | 10/1951 | United Kingdom | 248/564 |
| 930903 | 7/1963 | United Kingdom | 248/564 |
| 1156941 | 7/1969 | United Kingdom . | |

Primary Examiner—Ramon O. Ramirez
Assistant Examiner—Robert A. Olson
Attorney, Agent, or Firm—Allegretti & Witcoff

[57] ABSTRACT

A vibration compensating vehicle seat suspension combines the vertical movement of the parallelogram suspension with the pivoting of the knee-pivot suspension. Three embodiments all include a horizontal pivot for pivoting of the seat, and a sublinkage for simultaneous vertical movement of the seat. A first embodiment includes a horizontal pivot and a vertical slide for sliding of the pivot. A rocking lever which rocks due to pivoting of the seat causes sliding of the pivot. A second preferred embodiment includes a horizontal pivot and a linkage for vertical movement of the front of the seat. A third preferred embodiment includes a horizontal pivot, a vertical slide, and a spring for biasing the pivot.

3 Claims, 5 Drawing Sheets

FLOATING KNEE PIVOT SUSPENSION

This application is a continuation, of application Ser. No. 245,659, filed Sept. 16, 1988, now abandoned, which is a divisional of application Ser. No. 067,102, filed Jun. 26, 1987, now U.S. Pat. No. 4,828,216.

BACKGROUND OF THE INVENTION

This invention relates to seats which include vibration compensating seat suspensions.

Seats of vehicles such as tractor-trailer trucks are subject to substantial vibration. Severe vibrations occur as vehicles travel rough road surfaces. A majority of seats now made for operators of such vehicles include vibration compensating suspensions beneath the seats. Such suspensions are in addition to the vehicle suspension systems which interpose the wheels of the vehicle and the vehicle bodies. A pervasive seat suspension is the parallelogram suspension. This suspension takes its name from a parallelogram linkage which is central to the suspension. The parallelogram suspension provides purely vertical movement of the seat during vibration.

A suspension much improved over the parallelogram suspension is the suspension of U.S. Pat. No. 3,711,149. The suspension of this patent is a "knee-pivoting" suspension. This suspension takes its name from a pivoting of the seat about the front of the seat during vibration. The pivoting is in the area of the knee of the seat occupant. Such pivoting is desirable because it minimizes movement of the lower leg during vibration. The knee of the seat occupant flexes as the seat pivots, maintaining foot contact with vehicle controls. While lower leg movement is minimized, the seat also improves the quality of the ride of the occupant by eliminating the tendency of the upper body of the occupant to strike the back of the seat during rebound from vibration (commonly called "back-slapping").

SUMMARY OF THE INVENTION

The present invention is a vibration compensating vehicle seat suspension which is improved over the parallelogram suspension and also improved over the knee-pivoting suspension. The invention combines the best of both such suspensions. The invention combines vertical movement of the seat during vibration with knee-pivoting movement of the seat during vibration. As a result of a severe change of road surface, for example, a tractor-trailer driver will have his seat pivot downward beneath him, about a pivot in the area of the knee of his operating leg. Back-slapping action on rebound will be minimized. At the same time, the front of his seat will move slightly downward beneath him. Contact of the foot with the vehicle controls will not be sacrificed. At the same time, however, comfort will increase, because the knee of the operating leg will be cushioned by the slight vertical movement and the body will be moved more uniformly.

In a principal aspect, then, the invention is an improved vibration compensating vehicle seat suspension. The invention includes a vibration linkage which comprises a horizontal pivot for pivoting of the seat and a sublinkage for simultaneous vertical movement of the seat.

Three embodiments of the invention are included hereafter as part of the invention. By example, a first of the embodiments is a suspension as described, and comprising, in detail, a base including a first slide member. A second slide member is slidably mounted to the first slide member. A seat support member is pivotably mounted to the second slide member, while a link member is pivotably mounted to the base. A first slide actuator member is located on the link member. A second slide actuator member is pivotably mounted to the base, engaged by the first slide actuator member and engages the first slide member. Vibration causes the seat support member and link member to pivot. The pivoting of the link member causes pivoting of the first slide actuator member, which pivots the second slide actuator member. The pivoting of the second slide actuator member drives the second slide member down relative to the first slide member and the base. Overall motion is pivoting for the seat combined with vertical sliding of the seat front.

This embodiment, the other two embodiments, and the full range of advantages of the invention will be best understood upon a full reading of the detailed description of the preferred embodiments of the invention, which follows a brief description of the accompanying drawing.

BRIEF DESCRIPTION OF THE DRAWING

In the detailed description which follows, the preferred embodiments of the invention are described with reference to the accompanying drawing. Briefly, the drawing consists of ten figures, or views. These figures are as follows:

FIG. 9 is a side elevation view of portions of the third preferred embodiment of the invention, in a static state; and FIG. 10 is a side elevation view of the same portions of the third preferred embodiment of the invention as in FIG. 9, in motion due to a vibration of the vehicle (not shown) in which the seat is located.

DETAILED DESCRIPTION OF THE PREFERRED EMBODIMENTS

Figure 1:
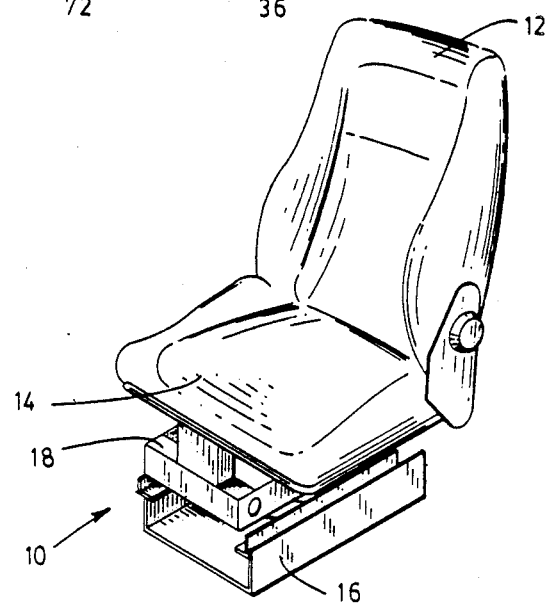
FIG. 1 is a perspective view of a seat according to the invention.

Referring to FIG. 1, the invention is an improvement in a suspension for a vehicle seat 10. For illustration, the back cushion 12 and seat cushion 14 of the seat 10 are shown, mounted above a base 16 to a vehicle body (not shown). A mechanism 18 interposes the seat cushion 14 and the base 16. The cushions 12, 14 are filled with foam rubber and covered with leather. The back cushion and seat cushion are contoured to include wings for the greater comfort and stability of an occupant. (While the contour and materials of the seat 10 are specified for illustration, an advantage of the invention is that the invention limits neither the shape nor materials of the seat with which it is employed. The seat incorporating the invention may be comfortable seat and an aesthetically pleasing seat.)

Figure 2:
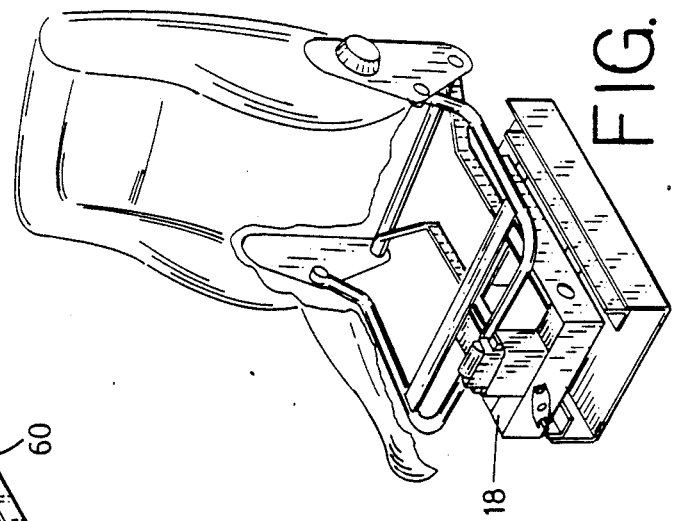
FIG. 2 is a perspective view of the seat of FIG. 1, with the cushions partially cut away to reveal that the seat is made according to a first preferred embodiment of the invention.

Referring to FIG. 2, the mechanism 18, as with the first preferred embodiment illustrated in FIG. 2, is contained in the area under the seat. The mechanism 18 occupies substantially the same space as the parallelogram suspension of the past, or the knee-pivot suspension of U.S. Pat. No. 3,711,149 (incorporated by reference).

Figure 3:
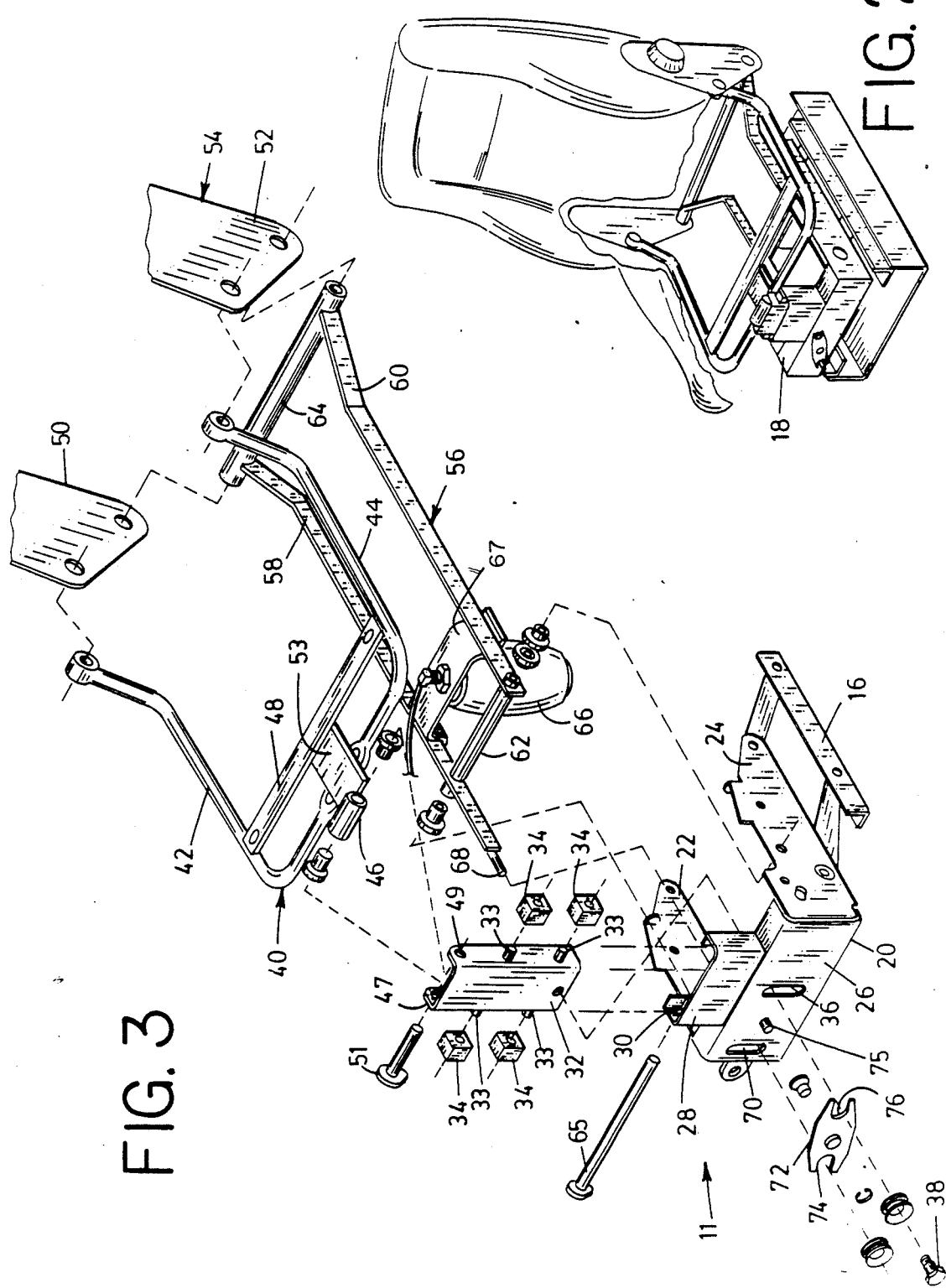
FIG. 3 is an exploded perspective view of portions of the first preferred embodiment of the invention.

Referring now to FIG. 3, a first preferred embodiment of the invention 11 includes a plurality of components. A chassis housing 20 is linked to the base 16 for conventional vertical and forward/backward static positioning of the seat 10 to suit the size and desires of an occupant. The housing 20 includes two upright, parallel side plates 22, 24 joined by an upright face plate 26. The plates are welded metal plates, and the face plate 26 forms rearwardly directed flanges at its upper and lower edges to which the side plates are joined for increased stability of the assembly.

An outer stanchion 28 is welded atop the face plate 26. The outer stanchion has a "C" shape in horizontal cross-section, thereby forming a vertically oriented, rectangular stanchion passage 30. A plurality of pins, slots and openings are defined on the chassis housing 20, as will be described hereafter.

An inner stanchion 32 includes a vertical face and two side flanges, formed integrally in the inner stanchion. The inner stanchion 32 has four pins 33 extending horizontally from the side flanges, two per side flange. A slide block 34 is fitted on each pin. The inner stanchion 32 with four slide blocks 34 is slidably movable within the stanchion passage 30 of the outer stanchion 28. The slide blocks 34 separate the inner stanchion 32 from direct sliding contact with the outer stanchion 28, and smooth the vertical sliding movement of the inner stanchion 32.

A slot 36 is defined in the face plate 26 of the chassis housing 20, beneath the outer stanchion 28. The slot is narrow horizontally, and extends vertically. The slot 36 receives a slide pin 38 mounted on the bottom of the face of the inner stanchion 32. The movement of the slide pin 38 is limited by the vertical extent of the slot 36. Thus, the slot 36 is a slide control slot, and the pin 38 is a slide control pin. Together, the slot 36 and pin 38 form one form of a means for limiting the extent of the vertical sliding movement of the inner stanchion 32 relative to the outer stanchion 28.

A welded steel cushion tube assembly 40 is mounted to the inner stanchion 32 for pivoting about a first, horizontal axis. The cushion tube assembly includes a pair of outer cushion tubes 42, 44 extending from a forward, central cushion pivot tube 46. The cushion pivot tube 46 is mounted to the inner stanchion 32 at a pair of pivot openings 47, 49 adjacent the top of the inner stanchion 32. Plastic bearings interpose the cushion pivot tube 46, the inner stanchion 32 and a pivot pin 51, and smooth the pivoting of the cushion pivot tube 46 relative to the inner stanchion 32 and pivot pin 51. A reinforcing bar 48 joins the outer cushion tubes and a central plate 53 back of the cushion pivot tube 46, to strengthen the assembly 40. The outer cushion tubes 42, 44 extend rearward from the reinforcing bar to plate steel arm brackets 50, 52 of a back cushion frame 54. Bushings, bearings and fasteners such as bolts (not shown) mount the arm brackets 50, 52 on the cushion tubes 42, 44 respectively, for pivoting motion of the arm brackets and back cushion about a second, horizontal axis.

A welded steel pivot arm assembly 56 underlies the cushion tube assembly 40. The pivot arm assembly 56 extends in two mirror-image arms 58, 60 formed of plate, from a forward pivot arm pivot tube 62 to a rear pivot arm pivot tube 64. The forward pivot arm pivot tube 62 is pivotably mounted via a pivot shaft 65 to slide plates 22, 24 of the chassis housing 20 for pivoting about a third, horizontal axis. The rear pivot arm pivot tube 64 is mounted to the back cushion frame arm brackets 50, 52 for pivoting about a fourth, horizontal axis. An air spring 66 is mounted under a plate 67 extending between the arms 58, 60 intermediate the pivot tubes 62, 64.

An arm 58 of the pivot arm assembly 56 includes a steel slide actuator pin 68. The pin 68 extends beyond and forward of the front pivot arm pivot tube 62, through a pin slot 70 in the face plate 26 of the chassis housing 20. The pin slot 70 is narrow horizontally, and extends vertically. The pin 68 engages a control bracket 72, within a pin recess 74.

Figure 4:
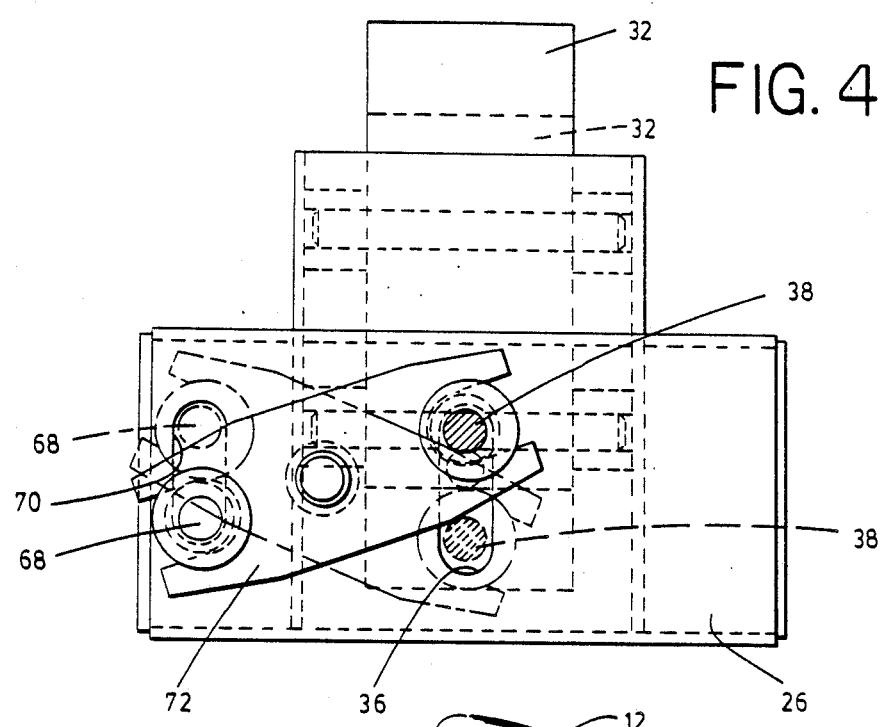
FIG. 4 is a front elevation, detail view of the portion of the first preferred embodiment shown in FIGS. 2 and 3.

The control bracket 72 is pinned to the chassis housing face plate 26, for rocking motion about a fifth horizontal axis perpendicular to the first through fourth axes (which are parallel to each other). The bracket 72 is pinned to a rocker pin 75, which lies between the pin slot 70 and the slide control slot 36. Opposite the slide actuator pin 68, the slide pin 38 engages the bracket 72, within a second recess 76. Referring to FIG. 4, when the slide actuator pin 68 is at the bottom of the pin slot 70, the slide pin 38 is at the top of the slide control slot 36, and the inner stanchion 32 is up. When, as in phantom, the slide actuator pin 68 is at the top of the pin slot 70, the slide pin 38 is at the bottom of the slot 36, and the inner stanchion 32 is moved down.

Figure 5:
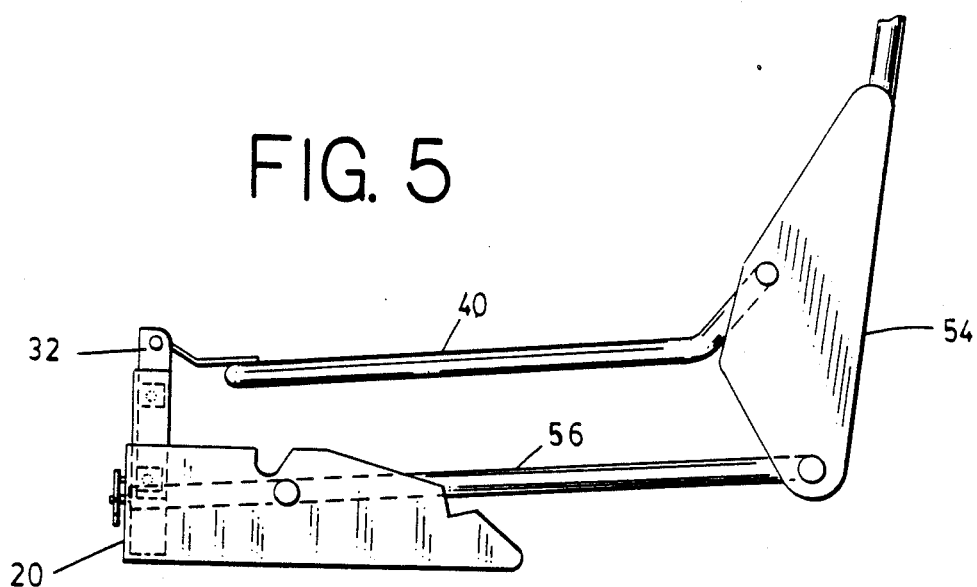
FIG. 5 is a side elevation view of portions of the first preferred embodiment of the invention, in a static state.
Figure 6:
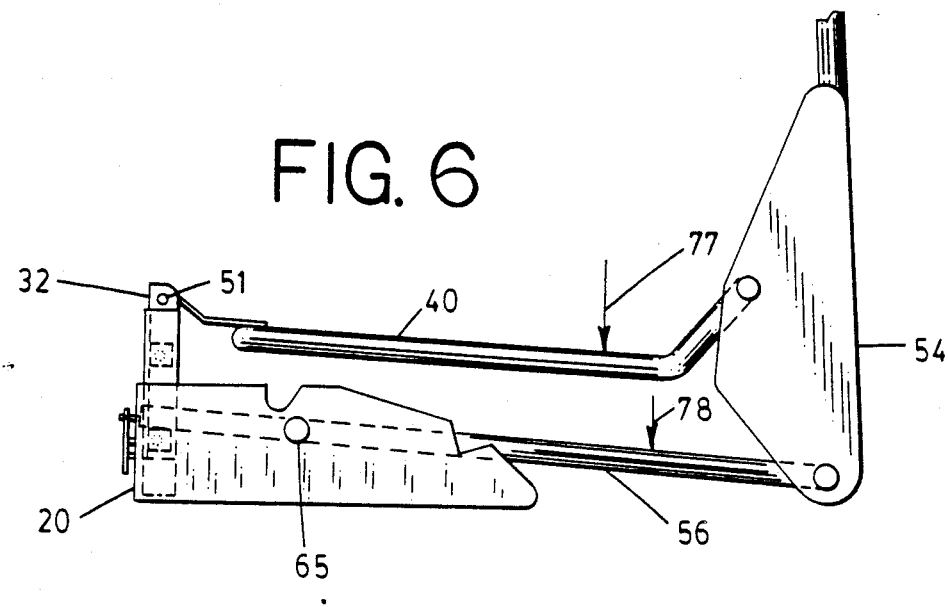
FIG. 6 is a side elevation view of the same portions of the first preferred embodiment of the invention as in FIG. 5, in motion due to a vibration of the vehicle (not shown) in which the seat is located.

Referring to FIGS. 5 and 6, the slide actuator pin 68 is at the bottom of the pin slot 70 when the cushion tube assembly 40 and pivot arm assembly 56 are in static positions, as shown in FIG. 5. The slide actuator pin 68 is at the top of the pin slot 70 when the cushion assembly 40 and pivot arm assembly 56 are in vibrated positions, as shown in FIG. 6.

Referring to FIG. 5, the air spring 66 shown in FIG. 3 causes the mechanism 18 to occupy and return from vibration to the static position shown in FIG. 5. The inner stanchion 32 is in a static, raised position relative to the outer stanchion 28. The cushion tube assembly 40 and pivot arm assembly 56 are in static positions suitable to comfortable, preferred seat positioning for an operator.

Vibration of a vehicle in which the seat 10 is located causes movement from the static positions of FIG. 5. Referring to FIG. 6, vibration causes the cushion tube assembly 40 to pivot downward about the pivot opening 47, 49 of the inner stanchion 32, as depicted by arrow 77. Movement of the back cushion frame 54 and pivot arm 56 is caused by movement of the cushion arm assembly 40. The pivot arm assembly 56 pivots downward about the shaft 65 on the chassis housing 20, as depicted by arrow 78. The back cushion frame 54 maintains its angle to the horizontal as it moves.

The pivoting of the pivot arm assembly 56 causes upward movement of the slide actuator pin 68. As described above, the inner stanchion 32 is moved down. The consequence is that upon vibration, the seat 10 pivots down and simultaneously, the front, knee area of the seat moves linearly down. Lengths and pivot locations are selected such that total linear movement of the seat front is about one inch. The air spring 66 causes position recovery, i.e., causes the seat to rebound from vibration.

As now may be understood, the first preferred embodiment of the invention includes a vibration linkage for a seat. The linkage includes, in this preferred embodiment, as one possible form of the linkage, the inner stanchion assembly, cushion tube assembly, pivot arm assembly, and portions of the back cushion frame. The linkage has a horizontal pivot at the top of the inner stanchion for pivoting of the seat and a sublinkage, comprising the slide actuator pin, control bracket and inner stanchion, for simultaneous vertical movement of the seat. The inner stanchion forms a vertical slide proximate the seat front along which the horizontal pivot is slid; the outer and inner stanchions constitute one possible form of first and second slide members, respectively.

Figure 7:
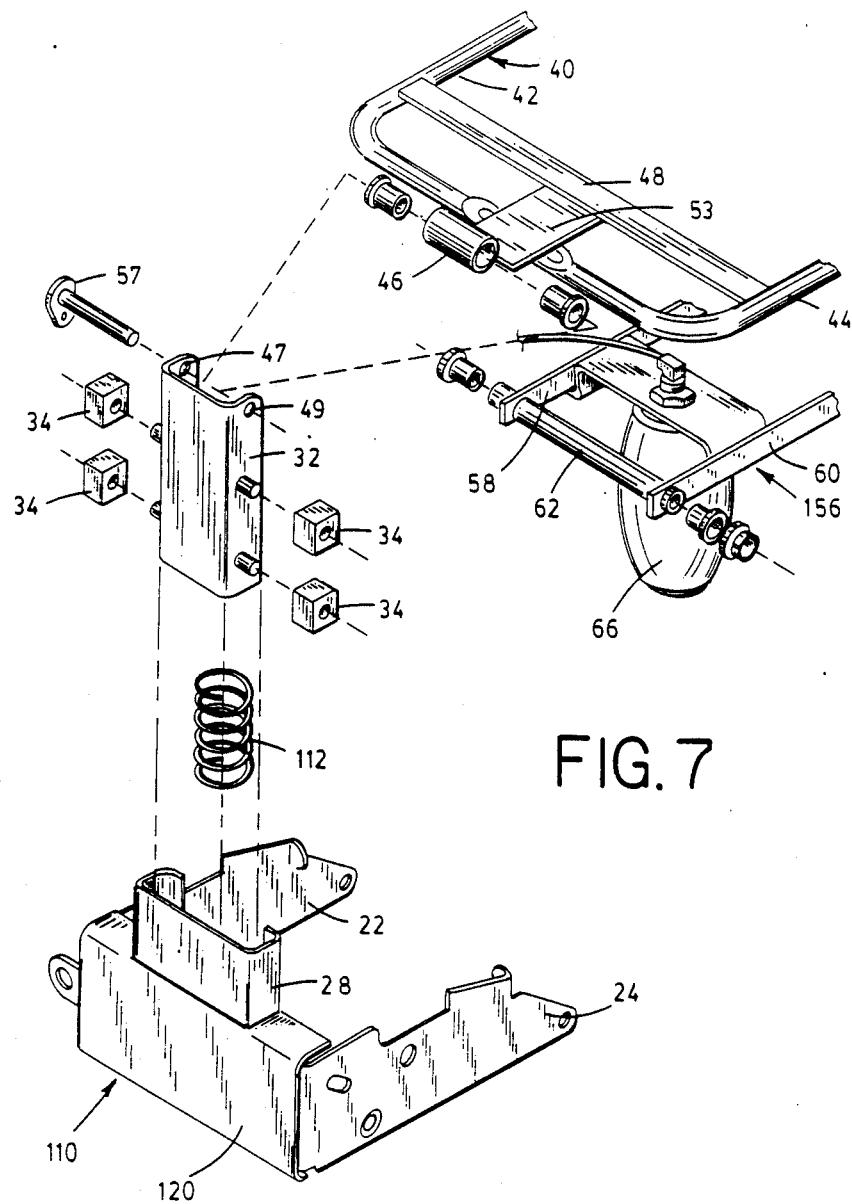
FIG. 7 is an exploded perpsective view of portions of a second preferred embodiment of the invention.

Attention is now directed to the second preferred embodiment 10. Some elements of the second preferred embodiment are identical to elements of the first preferred embodiment. Where identical, the elements have reference numerals identical to the first preferred embodiment. Referring to FIG. 7, the second preferred embodiment includes an inner stanchion 32 with slide blocks 34 in an outer stanchion 28. A cushion tube assembly 40 pivots on the inner stanchion 32. A pivot arm assembly 156, lacking a slide actuator pin 68, mounts on a chassis housing 120, lacking slots 36, 70 or rocker pin 75. A coil spring 112 substitutes for the slide actuator pin 68, rocker pin 75 and associated elements. The coil spring 112 is situated beneath the inner stanchion 32, between the inner stanchion 32 and the chassis housing 120. The coil spring 112 spring biases the inner stanchion 32 to a static position identical to the position of FIG. 5. As vehicle vibration overcomes the spring force, the coil spring 112 provides downward movement of the seat, simultaneous to pivoting movement of the seat to a position identical to the position of FIG. 6.

Figure 8:
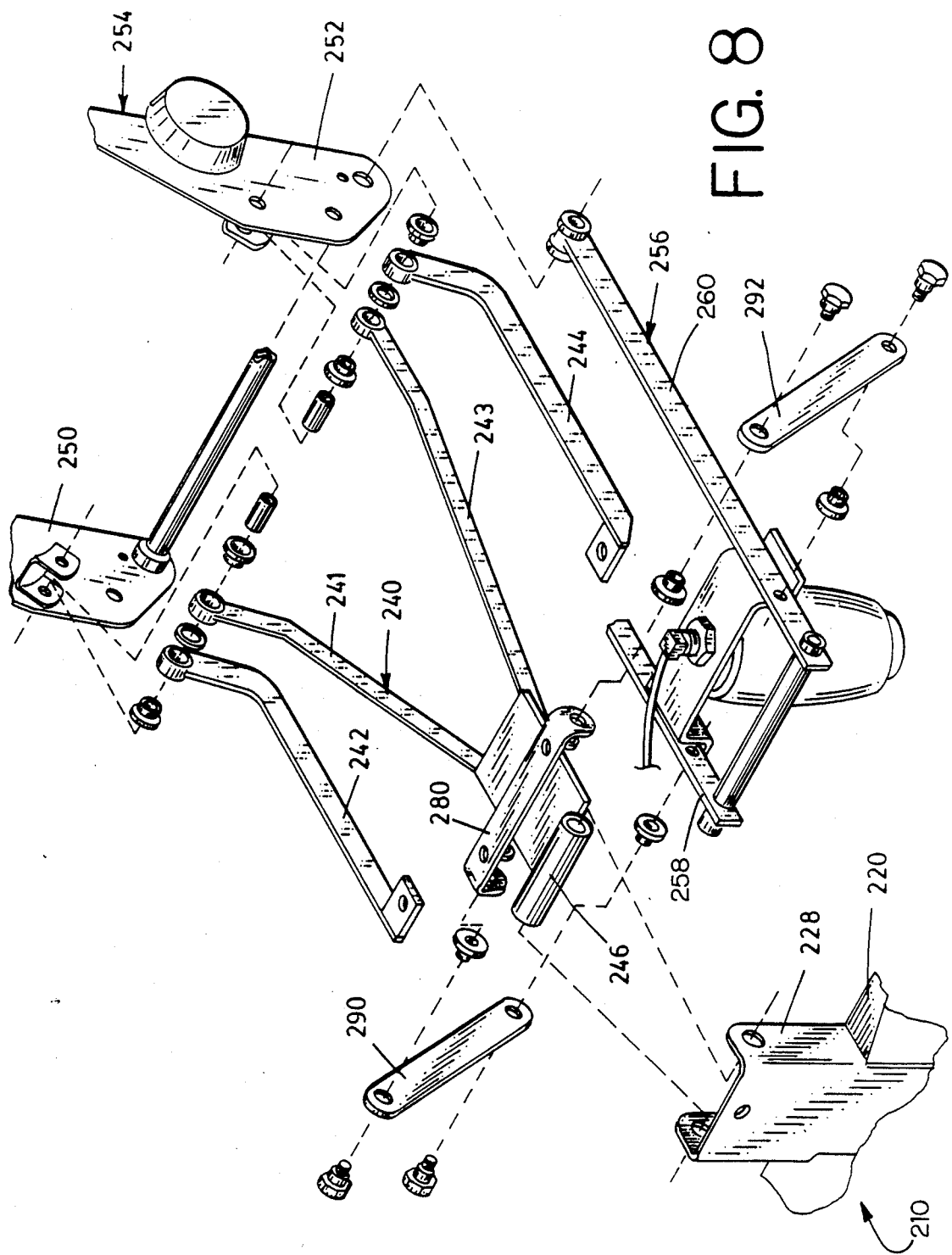
FIG. 8 is an exploded perspective view of portions of a third preferred embodiment of the invention.

Attention is now directed to the third preferred embodiment 210. The third preferred embodiment is the current commercially preferred embodiment, and differs more from the first preferred embodiment than does the second preferred embodiment. Referring to FIG. 8, a pivot tube 246 of a cushion arm assembly 240 is pivotably mounted directly on an outer stanchion 228. There is no sliding of the pivot tube 246.

Inner cushion arms 241, 243 extend rearward and outward of the pivot tube 246 to pivoting attachment to the arm brackets 250, 252 of a back cushion frame 254. Outer cushion arms 242, 244 attach with the inner cushion arms to the arm brackets, and extend forward to direct, fixed attachment to the seat cushion 14 (shown in FIG. 1). A front cushion support bracket 280 is independent of, i.e., not attached to any part of the cushion arm assembly 240. The bracket 280 attaches directly to the seat cushion 14, as do the outer arms 242, 244. Together with the arms 242, 244, the bracket 280 supports the seat cushion 14. Unlike cushion tube assembly 40 of the first preferred embodiment, tne inner arms 241, 243 are not directly attached to and do not directly support the seat cushion 14.

A pivot arm assembly 256 mounts to a chassis housing 220 and arm brackets 250, 252, in the same manner as assembly 56 mounts to housing 20 and arm brackets 50, 52.

In contrast to the preferred embodiment, cushion bracket arms 290, 292 are pivotably linked to the arms 258, 260 of the pivot arm assembly 256, between the assembly connection to the chassis housing and the arm brackets. The arms 290, 292 are also pivotably linked to the front cushion support bracket 280.

Referring to FIG. 9, the elements of the third preferred embodiment occupy static positions of desirable positioning of a seat. Referring to FIG. 10, vibration causes downward pivoting of the inner cushion arms 241, 243 and of the arms 258, 260 of the pivot arm assembly 256. Downward pivoting of the arms 258, 260 causes downward movement of the arms 290, 292, and with them, the front cushion support bracket 280. Because the cushion is attached to the bracket 280, downward movement of the bracket 280 causes downward movement of the seat cushion, along its front. Seat motion is substantially identical to seat motion in the first embodiment, despite difference of mechanism.

As now may be understood, the seat of the third preferred embodiment includes a vibration linkage of a plurality of links. The inner cushion arms 241, 243 constitute one possible form of first link members pivotably mounted to the seat base by mounting to the chassis housing 220. The bracket arms 290, 292 constitute one possible form of second link members, and the pivot arm assembly arms 258, 260 constitute one possible form of third link members. Pivots are formed as follows: (1) between the first link members and the seat base, first pivots; (2) between the first link members and cushion frame arm brackets 250, 252 third link, second pivots; (3) between the second link members and the seat cushion, at the front cushion support brackets, third pivots; (4) between the third link members and the second link members, fourth pivots; (5) between the third link members and the seat base, fifth pivots; and (6) between the third link members and the arm brackets, sixth pivots.

What is claimed is:

1. A seat subject to vibration in which the seat has a seat front portion and a seat rear portion comprising:
   a base;
   a seat cushion;
   a seat bracket;
   arm bracket;
   a first link member;
   a second link member; and
   a third link member;
   the seat bracket mounted on the seat cushion;
   the first link member pivotally mounted directly to the base forming a first pivot and pivotally mounted directly to the arm bracket forming a second pivot proximate the seat rear portion and away from the first pivot;
   the second link member pivotally mounted directly to the seat bracket forming a third pivot proximate the seat front portion and away from the second pivot and pivotally mounted directly to the third link member forming a fourth pivot away from the third pivot;
   the third link member pivotally mounted directly to the base forming a fifth pivot away from the fourth pivot and pivotally mounted directly to the arm brackets forming a sixth pivot away from the fifth pivot;

whereby, under vibration, the seat rear portion pivots about the base and the seat front portion both pivots and moves vertically relative to the base.

2. A seat subject to vibration as in claim 1, the arm bracket, first link member, second link member and third link member each comprising a pair of elements, the elements of each pair being spaced laterally from each other.

3. A seat subject to vibration as in claim 1 in which the first link member and the third link member extend rearward and outward from the third and fourth pivots respectively.

* * * * *